United States Patent
Bauvir et al.

(10) Patent No.: US 11,536,227 B2
(45) Date of Patent: Dec. 27, 2022

(54) INTERNAL COMBUSTION ENGINE SYSTEM

(71) Applicant: VOLVO TRUCK CORPORATION, Gothenburg (SE)

(72) Inventors: Laurent Bauvir, Lyons (FR); Lionel Simon, Lyons (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/659,752

(22) Filed: Apr. 19, 2022

(65) Prior Publication Data

US 2022/0341380 A1  Oct. 27, 2022

(30) Foreign Application Priority Data

Apr. 21, 2021 (EP) .................................... 21169650

(51) Int. Cl.
*F02M 26/71* (2016.01)
*F02M 35/104* (2006.01)
(Continued)

(52) U.S. Cl.
CPC ............ *F02M 26/71* (2016.02); *B01F 23/19* (2022.01); *B01F 25/1051* (2022.01);
(Continued)

(58) Field of Classification Search
CPC ...... F01N 13/107; F02M 26/19; F02M 26/71; F02M 35/10045; F02M 35/108;
(Continued)

(56) References Cited

U.S. PATENT DOCUMENTS

| 6,023,929 | A  | 2/2000 | Ma |
| 6,698,717 | B1 | 3/2004 | Brookshire et al. |

(Continued)

FOREIGN PATENT DOCUMENTS

| DE | 3017468 A1 | * 11/1980 |
| DE | 102004021212 A1 | 11/2005 |

(Continued)

OTHER PUBLICATIONS

European Search Report dated Jul. 15, 2021 in corresponding European Patent Application No. 21169650.5, 9 pages.

(Continued)

*Primary Examiner* — Ngoc T Nguyen
(74) *Attorney, Agent, or Firm* — Venable LLP; Jeffri A. Kaminski (57) ABSTRACT

A first intake manifold is connected to a first group of cylinders, a second distinct intake manifold is connected to a second group of cylinders and a first, respectively a second, exhaust manifold for receiving the exhaust gas emitted from the first, respectively the second, group of cylinders. An EGR line is connected to the first and second exhaust manifolds. A mixing unit includes a four-way valve having a first inlet connected to an air line, a second inlet connected to the EGR line, a first outlet connected to the first intake manifold and a second outlet connected to the second intake manifold. The first inlet is connected to the air line, the second inlet is connected to the EGR line. The first outlet and said second outlet form a substantially X-shape. The first inlet and said second inlet are coaxial. The first outlet and second outlet are coaxial such that the first inlet is diagonally facing the second inlet and the first outlet is diagonally facing the second outlet.

15 Claims, 3 Drawing Sheets

(51) Int. Cl.
  *F01N 13/10* (2010.01)
  *B01F 25/00* (2022.01)
  *F02D 41/00* (2006.01)
  *B01F 23/10* (2022.01)
  *F02M 26/14* (2016.01)

(52) U.S. Cl.
  CPC ......... *F01N 13/10* (2013.01); *F02D 41/0087* (2013.01); *F02M 26/14* (2016.02); *F02M 35/104* (2013.01)

(58) Field of Classification Search
  CPC .. F02B 27/0252; F02D 17/02; F02D 41/0065; F02D 41/0087
  See application file for complete search history.

(56) References Cited

U.S. PATENT DOCUMENTS

| | | | |
|---|---|---|---|
| 8,230,681 B2 | 7/2012 | Kobayashi et al. | |
| 9,835,116 B2* | 12/2017 | Kuenzel | F02M 26/43 |
| 9,856,806 B2* | 1/2018 | Bjurman | F02D 17/02 |
| 10,480,377 B2 | 11/2019 | Free et al. | |
| 10,655,572 B2 | 5/2020 | Inagaki et al. | |
| 2002/0166547 A1* | 11/2002 | Bailey | F02M 26/53 60/605.2 |
| 2006/0213189 A1 | 9/2006 | Allansson et al. | |
| 2010/0037856 A1* | 2/2010 | Dickerson | F02B 37/02 60/602 |
| 2011/0061380 A1 | 3/2011 | Leroux et al. | |
| 2014/0102429 A1 | 4/2014 | Hayman et al. | |
| 2016/0298557 A1 | 10/2016 | Bjurman | |
| 2017/0260916 A1* | 9/2017 | Kraemer | F02B 75/20 |

FOREIGN PATENT DOCUMENTS

| | | |
|---|---|---|
| EP | 1612393 A1 | 1/2006 |
| EP | 2295769 A1 | 3/2011 |
| EP | 2375046 A1 | 10/2011 |
| EP | 2653710 A1 | 10/2013 |
| EP | 2700851 A1 | 2/2014 |
| EP | 2019/078906 W | 4/2021 |
| IT | BO20100210 A1 | 10/2011 |
| WO | 2015004497 A1 | 1/2015 |
| WO | 2021078379 A1 | 4/2021 |

OTHER PUBLICATIONS

European Search Report dated Jul. 8, 2021 in corresponding European Patent Application No. 21169650.5 4 pages.

* cited by examiner

INTERNAL COMBUSTION ENGINE SYSTEM

TECHNICAL FIELD

The invention relates to an internal combustion engine operable in at least three operating modes, respectively a normal operating mode and two cylinder deactivation modes.

The invention can be applied in heavy-duty vehicles, such as trucks, buses and construction equipment. Although the invention will be described with respect to a truck, the invention is not restricted to this particular vehicle, but may also be used in other vehicles such as buses, construction equipment and passenger cars. The invention may also be used on other transportation means such as ships and boats. Last, the invention may be used in non-propulsive applications of engines, like gensets and all form of industrial machines.

BACKGROUND

For a vehicle internal combustion engine, such as a diesel type engine for a heavy-duty vehicle, an exhaust after treatment system (EATS) is usually provided to reduce emissions, e.g. of nitrogen oxides (NOx). Such a system, which may include units such as a selective catalytic reduction (SCR) converter, requires exhaust gas temperatures that are relatively high in order to provide an efficient emission reduction.

However, measures to reduce fuel consumption may reduce the heat loss from the engine to the EATS. Therefore, particularly at low load operation, cold ambient temperatures, and/or cold start events, the EATS might not get enough heat to operate efficiently. In particular, the SCR catalyst is usually more effective when the temperature of the exhaust gas is high. Accordingly, increasing the exhaust gas temperature helps increasing NOx reduction and reducing NOx emissions.

To increase the temperature of the exhaust gases of an engine, a known solution consists to deactivate some of the engine cylinders, i.e. to shut off the fuel supply and air intake in some of the engine cylinders. As a result, cylinders that have been deactivated no longer draw fresh air, the volume of air drawn in by the engine block (acting as a volumetric pump) is lower. A side effect might be that the turbocharger losses efficiency: Therefore, the mass airflow rate supplied to each active cylinder can be reduced in comparison with the normal operating mode. In parallel, the total fuel flow injected into the engine cylinders remains the same to ensure that the engine delivers the same power. As some cylinders have been deactivated and therefore no longer receive fuel, the fuel flow injected into the remaining cylinders, i.e. the active cylinders, is mathematically higher. Under these conditions, the Air-Fuel Ratio (AFR) inside the active cylinders is lower and the exhaust gas temperature increases.

Increasing the temperature of the exhaust gases may have several benefits such as Diesel Particulate Filter (DPF) cleaning and NOx emissions reduction.

In addition to increasing the exhaust gas temperature, cylinder deactivation can have other advantageous consequences such as fuel savings (in particular in the case of a gasoline engine).

However, conventional solutions lead to add much complexity in the engine structure and decrease the free space around the engine, which is a major drawback during engine assembly or maintenance operations.

The patent application EP2019/078906 discloses an internal combustion engine system including a mixing unit comprising a four-way valve having a first inlet connected to the EGR line, a second inlet connected to the air inlet line, a first outlet connected to the first intake manifold and a second outlet connected to the second intake manifold; said a first inlet connected to the EGR line and said second outlet being coaxial and said second inlet connected to the air inlet line and said first inlet being coaxial such that the first inlet connected to the EGR line is diagonally facing the second outlet and the second inlet connected to the air inlet line is diagonally facing the first outlet.

Nevertheless, the design of this internal combustion engine system is based on theoretical calculations. Although this internal combustion engine system permits to control the flow of fresh air and exhaust gas supplied to the engine cylinders while maintaining a relatively simple structure for the engine and to have a lower impact on the dimensions of the whole system, the flow of fresh air and exhaust gas can be further optimized in practice.

SUMMARY

An object of the invention is to provide an internal combustion engine system operable in at least three operating modes, respectively a normal operating mode and two cylinder deactivation modes, in which some of the engine cylinders are deactivated, and in which the drawbacks of the known solutions are avoided.

The object is achieved by an internal combustion engine system, comprising:
- an internal combustion engine comprising a cylinder block housing a plurality of cylinders, a first intake manifold connected to a first group of cylinders, a second distinct intake manifold connected to a second group of cylinders and a first, respectively a second, exhaust manifold for receiving the exhaust gas emitted from the first, respectively the second, group of cylinders;
- an air line;
- an EGR line connected to the first and second exhaust manifolds;
- the system also includes a mixing unit comprising a four-way valve, said four-way valve having a first inlet connected to the air line, a second inlet connected to the EGR line, a first outlet connected to the first intake manifold and a second outlet connected to the second intake manifold;
- the system being characterized in that:
- said first inlet connected to the air line, said second inlet connected to the EGR line, said first outlet and said second outlet form a substantially X-shape;
- said first inlet connected to the air line and said second inlet connected to the EGR line are coaxial and the first outlet and second outlet are coaxial such that the first inlet connected to the air line is diagonally facing the second inlet connected to the EGR line and the first outlet is diagonally facing the second outlet.

By the provision of an internal combustion engine system which comprises a mixing unit comprising the four-way valve with a specific design, the advantage is that the control of the flow of fresh air and exhaust gas supplied to the engine cylinders is improved. Indeed, the inventors have discovered that in practice, the design of the four-way valve has an important impact on the flow pattern of fresh air and exhaust gas. When the first inlet connected to the air line and the second inlet connected to the EGR line are coaxial and the first outlet and the second outlet are coaxial such that the first inlet connected to the air line is diagonally facing the first second connected to the EGR line and the first outlet is diagonally facing the second outlet, the symmetry of pressure drops for fresh air and exhaust gas and the mixing of fresh air and exhaust gas is carried out in more equal proportion. The specific design of the four-way valve combines significant advantage of the specific fresh air and exhaust gas flow characteristics while ensuring all use case requirements. Finally, the mixing unit maintains a relatively simple structure for the engine and has a lower impact on the dimensions of the whole system.

According to one embodiment, the four-way valve comprises a housing defining an internal chamber, the internal chamber having a first portion in fluid communication with the first inlet and the first outlet of the four-way valve and a second portion in fluid communication with the second inlet and the second outlet of the four-way valve, the first and second portions being separated by a central opening, the central opening being selectively closed by a flap.

It is understood that the first portion and the second portion are geometric portions wherein the fluid communications are defined independently of the position of the flap. The central opening may be considered as a plane extending between the first portion and the second portion, or geometrically separating the first portion and the second portion from each other. The first portion and the second portion are in fluid communication via the central opening, and depending on the position of the flap. For example, when the central opening is closed by the flap, the first inlet may be in fluid communication with the first outlet only and the second inlet may be in fluid communication with the second outlet only. It is understood that depending on the position of the flap, the first inlet may be in fluid communication with the first outlet only and the second inlet may be in fluid communication with the second outlet only, the first inlet may be in fluid communication with the second outlet only and the second inlet may be in fluid communication with the first outlet only, or the first inlet may be in fluid communication with both the first and the second outlet and the second inlet may be in fluid communication with both the first and the second outlet.

According to one embodiment, the flap is rotatably movable inside the internal chamber. Preferably, the flap can enter in contact with seats located in the internal chamber to reach a configuration. In this embodiment, it is possible to ensure minimum leakage.

According to one embodiment, the flap comprises a central hub connected to a first and a second symmetrical wings. In this embodiment, it is believed that the symmetry of the flap allows a better distribution of the fresh air and/or exhaust gas.

According to one embodiment, the flap is configured to rotate around a flap axis; said flap axis being coaxial to a housing axis located at the center of the four-way valve housing.

According to one embodiment, the wings extend in a plane that is off-centered with respect to the flap axis. In this embodiment, it is believed that the flow area above the flap plane, i.e. including the fresh air flow, is more important that the flow area below the flap plane, i.e. including the exhaust gas notably in the nominal operating mode. Thus, the advantage is to offer a reduced air flow resistance especially when the fresh air flow is more important than the exhaust gas. Then, by off-centering the plane of the flap, the turbulences and the losses are reduced at the contact of the plane. The flow nicely marries the shape of the flap going in the first or in the second outlet.

According to one embodiment, the system comprises a controller for controlling the four way-valve.

According to one embodiment, an EGR valve is arranged downstream of the first, respectively the second, exhaust manifold on the path of exhaust gas flowing towards the EGR line, said EGR valves controlling the flow of exhaust gas through the EGR line.

According to one embodiment, the first and second exhaust manifolds jointly form a single exhaust manifold.

According to one embodiment, the system includes a turbocharger comprising an air compressor and a turbine for driving said compressor, the turbine being arranged to be driven by exhaust gas flowing from the first and second exhaust manifolds to an exhaust after treatment system, the air compressor being arranged to supply compressed air to the air inlet line.

According to a further aspect of the invention, the object is achieved by a vehicle comprising an internal combustion engine system according to any preceding claim.

According to a further aspect of the invention, the object is achieved by a method for operating the internal combustion engine system according to the present invention, said method comprising the following steps:
  A. Selecting an operating mode of the internal combustion engine system, said operating mode being selecting between:
    i. a nominal operating mode in which all cylinders are supplied with fuel and,
    ii. a cylinder deactivation mode in which the cylinders of the first group of cylinders are not supplied with fuel and
    iii. a cylinder deactivation mode in which the cylinders of the second group of cylinders are not supplied with fuel and
  B. Controlling the four-way-valve depending on the operating mode selected in step A).

According to one embodiment, in said nominal operating mode i), the intake gases supplied to the first intake manifold and to the second intake manifold have the same proportion of exhaust gas and the same proportion of air.

According to one embodiment, in said cylinder deactivation mode ii), the intake gas supplied to the second intake manifold includes fresh air.

According to one embodiment, the intake gas supplied to the first intake manifold includes (for example solely) exhaust gas.

According to one embodiment, in said cylinder deactivation mode iii), the intake gas supplied to the first intake manifold includes fresh air.

According to one embodiment, the intake gas supplied to the second intake manifold includes (for example solely) exhaust gas.

According to one embodiment, in step B), the four-way-valve is controlled to reach a configuration selected from:
  1. A first configuration of the valve corresponding to the nominal operating mode i),
  2. A second configuration of the valve corresponding to the cylinder deactivation mode ii) and
  3. A third configuration of the valve corresponding to the cylinder deactivation mode iii).

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
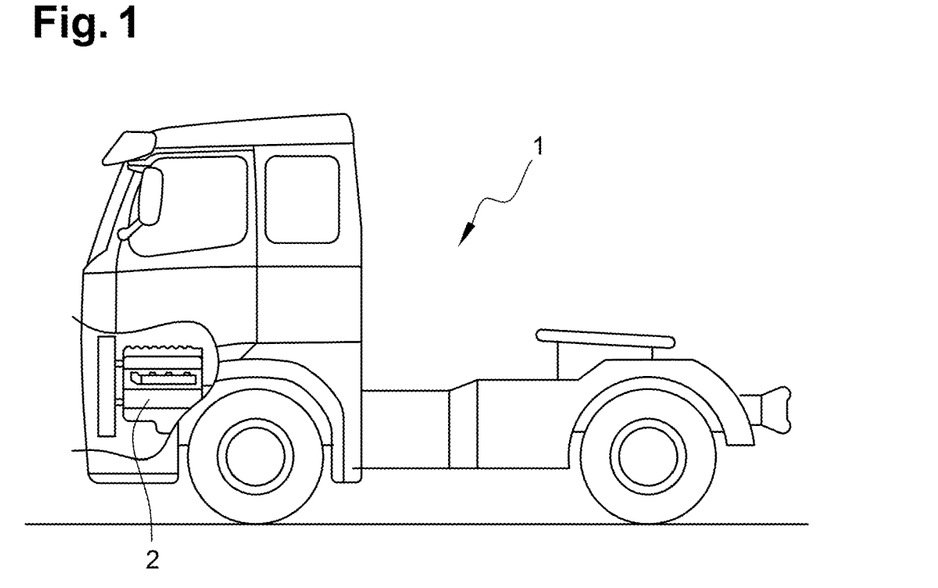
FIG. 1 is a side view of a truck comprising an internal combustion engine.

FIG. 1 shows a vehicle 1 in the form of a truck in a partly cut side view. The vehicle 1 has an internal combustion engine 2 for the propulsion of the vehicle.

Figure 2:
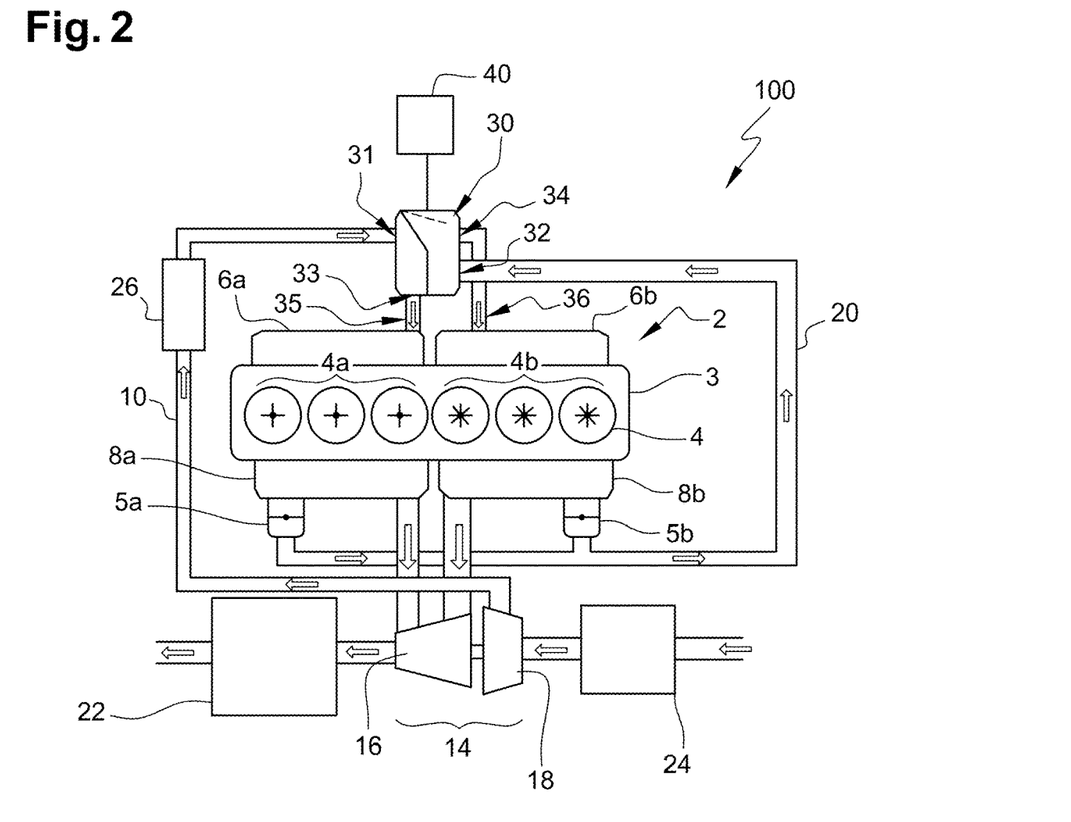
FIG. 2 is a schematic view of an internal combustion engine system according to the invention, belonging to the vehicle of FIG. 1.

In reference to FIG. 2, an internal combustion engine system 100 is shown which is used in the vehicle of FIG. 1 or in any other vehicle comprising an internal combustion engine. The system 100 comprises an internal combustion engine 2 with a cylinder block 3 having a plurality of cylinders 4, e.g. six cylinders in an inline configuration. The cylinders 4 are divided into a first group of cylinders 4a and a second group of cylinders 4b. In the example shown, there are three cylinders 4 in the first group of cylinders 4a and three cylinders 4 in the second group of cylinders 4b. It should be noted that the invention is equally applicable to engines with a different number of cylinder, e.g. two, three, four etc. Also, the number of cylinders in the first and second groups of cylinders 4a, 4b may be mutually different. In addition, the cylinder may have a configuration which different from an inline configuration, e.g. a V-configuration.

The internal combustion engine is preferably a Diesel engine. However, it can also be a gasoline engine or an engine working with any other fuel, such as an ethanol-fuelled engine.

Furthermore, the internal combustion engine 2 has a first intake manifold 6a for providing gas to the first group of cylinders 4a and a second intake manifold 6b for providing gas to the second group of cylinders 4b. The internal combustion engine 2 has also a first exhaust manifold 8a for receiving the exhaust gas emitted from the first group of cylinders 4a and a second exhaust manifold 8b for receiving the exhaust gas emitted from the second group of cylinders 4b. In an alternative embodiment (not shown), the first and second exhaust manifolds 8a, 8b may jointly form a single exhaust manifold.

A part of the exhaust gas is led to a turbocharger 14 comprising a turbine 16 and an air compressor 18 and onward to an exhaust gas aftertreatment system 22. The turbocharger 14 can be used for the compression of the fresh air that is supplied to the first and second intake manifolds 6a, 6b through an air inlet line 10 and via a mixing unit 30 which will be detailed in the following paragraphs. The fresh air may be filtered in an air filter 24 before its compression, and may be cooled in a charged air cooler 26 after its compression.

The exhaust gas aftertreatment system 22 usually comprises a plurality of exhaust gas aftertreatment units, such as e.g. a diesel oxidation catalyst, a particulate filter and a selective catalytic reactor (SCR).

A SCR unit is conventionally a means for converting nitrogen oxides by means of a catalyst into nitrogen and water. An optimal temperature range for these reactions is typically between approximately 250° C. and approximately 450° C. This optimal operating temperature can be easily kept during normal (driving) operation modes of the engine.

However, during idle or motoring engine operation modes of the internal combustion engine 2, the temperature of the exhaust gas drops. The reason for that is that fresh air at ambient temperature is fed to the intake manifolds 6a, 6b, even if combustion is reduced considerably (as in the idle engine operation mode) or no combustion takes place at all (as in the motoring engine operation mode). This in turn means that the internal combustion engine 2 is simply pumping fresh and cool air to the exhaust manifolds 8a, 8b and onward into the exhaust gas aftertreatment system 22. This cool air causes the exhaust gas aftertreatment system 22 to cool down rapidly below its optimal operating temperature, which in turn results in poor or no exhaust gas purification, so that the required NOx emission levels cannot be achieved.

For increasing the temperature of the exhaust gas streaming through the exhaust gas aftertreatment system 22, it is proposed in the present invention to operate the system 100 in two Cylinder Deactivation mode ii) and iii) (known as "CDA mode" or "NOx reduction mode" in the literature).

In the cylinder Deactivation mode ii), the cylinders 4 of the first group of cylinders 4a are controlled to be inactive, that means no fuel is injected into the cylinders 4 of the first group of cylinders 4a, and during which the cylinders 4 of the second group of cylinders 4b in contrast are controlled to be active. That means the load required for operating the engine in the cylinder deactivation mode is only provided by the second group of cylinders 4b. As mentioned in the introduction above, this, in turn, means that the cylinders 4a that have been deactivated no longer draw fresh air, the volume of air drawn in by the engine block (acting as a volumetric pump) is lower. A side effect might be that the turbocharger 14 losses efficiency: Therefore, the mass airflow rate supplied to each active cylinder can be reduced in comparison with the normal operating mode. In parallel, the fuel flow injected into the engine cylinders remains the same to ensure that the engine delivers the same power. As some cylinders 4a have been deactivated and therefore no longer receive fuel, the fuel flow injected into the remaining cylinders, i.e. the active cylinders 4b, is mathematically higher. Under these conditions, the Air-Fuel Ratio (AFR) inside the active cylinders 4b is lower and the exhaust gas temperature increases.

In the cylinder Deactivation mode iii), the cylinders 4 of the second group of cylinders 4b are controlled to be inactive, that means no fuel is injected into the cylinders 4 of the second group of cylinders 4b, and during which the cylinders 4 of the first group of cylinders 4a in contrast are controlled to be active. That means the load required for operating the engine in the cylinder deactivation mode is only provided by the first group of cylinders 4a. As mentioned in the introduction above, this in turn means that the cylinders 4b that have been deactivated no longer draw fresh air, the volume of air drawn in by the engine block (acting as a volumetric pump) is lower. A side effect might be that the turbocharger 14 losses efficiency: Therefore, the mass airflow rate supplied to each active cylinder can be reduced in comparison with the normal operating mode. In parallel, the fuel flow injected into the engine cylinders remains the same to ensure that the engine delivers the same power. As some cylinders 4b have been deactivated and therefore no longer receive fuel, the fuel flow injected into the remaining cylinders, i.e. the active cylinders 4a, is mathematically higher. Under these conditions, the Air-Fuel Ratio (AFR) inside the active cylinders 4a is lower and the exhaust gas temperature increases.

In practice, the temperature of the exhaust gas can increase by up to 250° C., preferably up to 300° C., during the cylinder deactivation mode.

It can be added that, even if the mass air flow introduced into the active cylinders 4a or the active cylinders 4b is reduced, it remains sufficiently large to ensure complete combustion of the fuel, so that all the fuel introduced into the combustion cylinders 4b is burned and there is no fuel in the exhaust gases. Cylinder deactivation mode then differs from a standard regeneration operating mode in which a small quantity of fuel is directly injected into the flow of exhaust gas to increase its temperature. Cylinder deactivation mode also differs from other exhaust temperature heating means consisting in increasing heat losses and which are thus less fuel efficient.

Furthermore, the system 100 comprises an EGR line 20 which is branched off at the first exhaust manifold 8a, respectively the second exhaust manifold 8b, said EGR line 20 being fluidly connected to the mixing unit 30. The EGR line 20 is thus adapted to supply the mixing unit 30 with recirculated exhaust gas generated by the internal combustion engine 2. A first EGR valve 5a, respectively a second EGR valve 5b, arranged downstream to the first exhaust manifold 8a, respectively to the second exhaust manifold 8b, may advantageously be provided for regulating the amount of recirculated exhaust gas that is supplied to the EGR line 20.

The mixing unit 30 comprises a first inlet 31 fluidly connected to the air line 10, a second inlet 32 fluidly connected to the EGR line 20, a first outlet 33 fluidly connected to the first intake manifold 6a via a first pipe 35 and a second outlet 34 fluidly connected to the second intake manifold 6b via a second pipe 36. The mixing unit 30 is adapted to control the flow of fresh air and exhaust gas supplied to the first and second intake manifolds 6a, 6b by the air inlet and EGR lines 10, 20. The mixing unit 30 consists in a four-way valve wherein the first inlet 31 connected to the air line 10, the second inlet 32 connected to the EGR line 20, the first outlet 33 and the second outlet 34 form a substantially X-shape. Additionally, the first inlet 31 connected to the air line 10 and the second inlet 32 connected to the EGR line 20 are coaxial and the first outlet 33 and the second outlet 34 are coaxial such that the first inlet 31 connected to the air line 10 is diagonally facing the second inlet 32 connected to the EGR line 20 and the first outlet 33 is diagonally facing the second outlet 34.

In particular, in the nominal operating mode i) of the system 100, the mixing unit 30 is adapted to allow a flow of a mix of fresh air and exhaust gas to both the first and second intake manifolds 6a, 6b. This corresponds to the first configuration of the four-valve 30, i.e. a fully opened configuration of the mixing unit 30. Furthermore, in a partially opened configuration of the mixing unit 30, the mixing unit 30 may prevent a flow of fresh air to the first intake manifold 6a but may allow a flow of exhaust gas to both the first and second intake manifolds 6a, 6b.

In the cylinder deactivation mode ii) of the system 100, the mixing unit 30 is adapted to prevent a flow of fresh air to the first intake manifold 6a and a flow of exhaust gas to the second intake manifold 6b while allowing a flow of exhaust gas to the first intake manifold 6a and a flow of fresh air to the second intake manifold 6b. This corresponds to a closed configuration of the mixing unit 30.

In the cylinder deactivation mode iii) of the system 100, the mixing unit 30 is adapted to prevent a flow of fresh air to the second intake manifold 6b and a flow of exhaust gas to the first intake manifold 6a while allowing a flow of exhaust gas to the second intake manifold 6b and a flow of fresh air to the first intake manifold 6a. This corresponds to a closed configuration of the mixing unit 30.

The system 100 may advantageously comprise a controller 40 for controlling the opening, the closing and/or the partial opening of the mixing unit 30 depending on the operating mode of the system 100.

Figure 3:
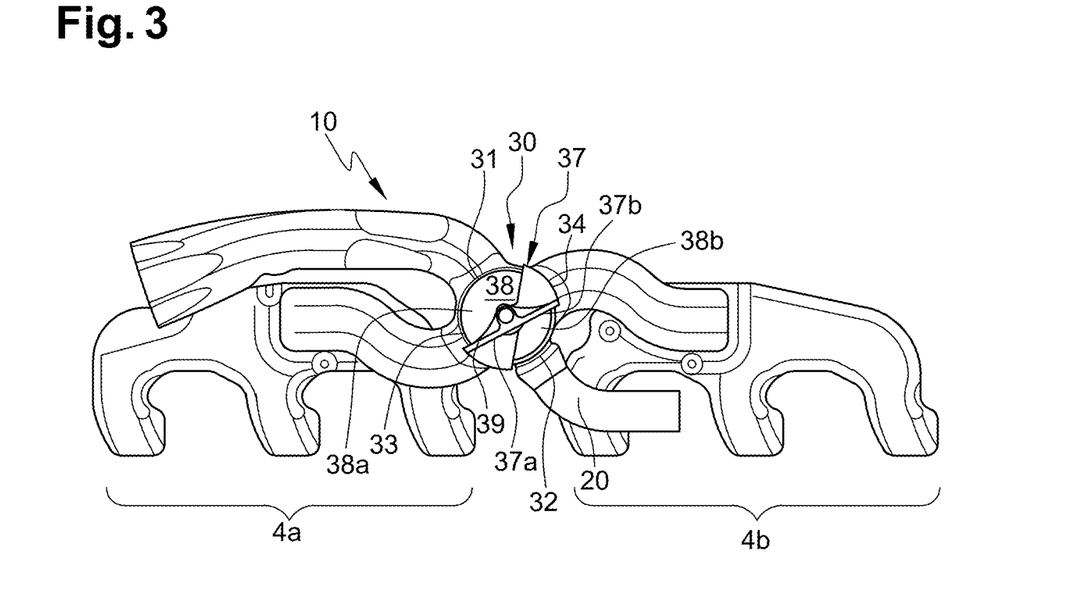
FIG. 3 is a schematic view of the mixing unit including the four-way valve of an internal combustion engine system according to a first embodiment of the invention.
Figure 4:
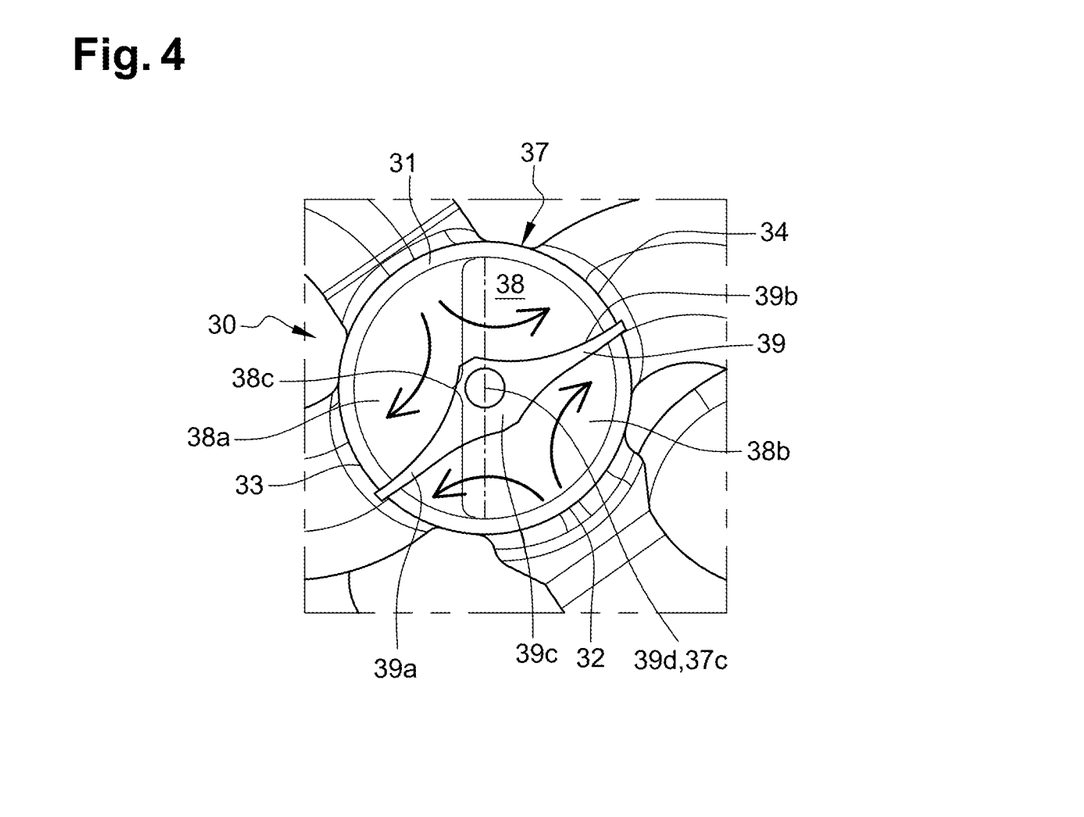
FIG. 4 is a schematic view of the mixing unit including the four-way valve of an internal combustion engine system according to a first embodiment of the invention.

FIGS. 3 and 4 illustrate the upper portion of the internal combustion engine system 100 shown in FIG. 2 in a first embodiment of the invention. In this embodiment, the mixing unit 30 comprises a four-way valve comprising a housing 37 defining an internal chamber 38. The internal chamber 38 having a first portion 38a in fluid communication with the first inlet 31 and the first outlet 33 of the four-way valve 30 and a second portion 38b in fluid communication with the second inlet 32 and the second outlet 34 of the four-way valve 30, the first and second portions 38a, 38b being separated by a central opening 38c. The four-way valve 30 further comprises a flap 39 including a central hub 39c connected to a first 39a and a second 39b symmetrical wings. The flap 39 is pivotally connected to the housing 37 around a flap axis 39c that is substantially aligned with the central opening 38c. The flap axis 39c is coaxial to a housing axis 37c located at the center of the four-way valve housing 37. The wings 39a, 39b extend in a plane that is off-centered with respect to the flap axis 39d.

In reference to FIGS. 3 and 4, it is illustrated the first configuration of the valve 30. In this configuration, the wings 39a, 39b of the flap 39 can be respectively in contact with seats 37a, 37b to allow a non-restricted flow of gas between the first and second portions 38a, 38b in both bottom and top parts of the internal chamber 38. Alternatively, the wings 39a, 39b of the flap 39 are controlled to reach a position allowing a non-restricted gas flow between the first and second portions 38a, 38b in both bottom and top parts of the internal chamber 38 without requiring seats. This configuration of the valve 30 corresponds to the nominal operating mode i) of the system 100 in which a mix of exhaust gas and fresh air is supplied to the cylinders 4 of the first and second groups of cylinders 4a, 4b.

Figure 5:
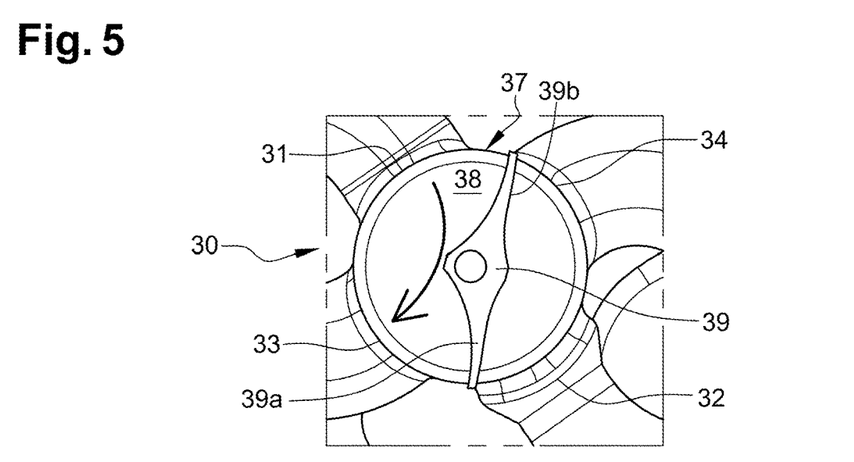
FIG. 5 is a schematic view of the mixing unit including the four-way valve of an internal combustion engine system according to a second embodiment of the invention.
Figure 6:
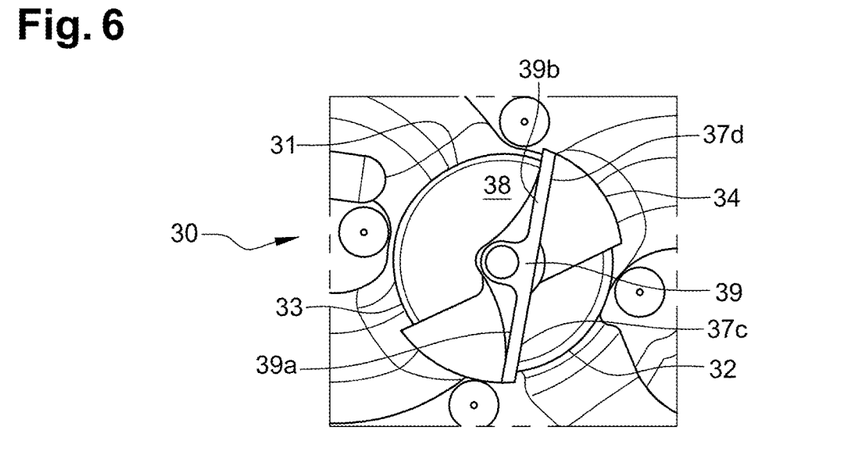
FIG. 6 is a schematic view of the mixing unit including the four-way valve of an internal combustion engine system according to the second embodiment of the invention and FIG. 7 is a schematic view of the mixing unit including the four-way valve of an internal combustion engine system according to a third embodiment of the invention.

As illustrated in FIGS. 5 and 6, the wings 39a, 39b of the flap 39 are respectively in contact with seats 37c, 37d. In this second configuration of the valve 30, the fresh air supplied by the air inlet line 10 is guided through the first group of cylinders 4a only. The intake of fresh air for the second group of cylinders 4b is thus controlled to be zero or almost zero. In the same time, the entire flow of exhaust gas supplied by the EGR line 20 is guided through the second group of cylinders 4b only (FIG. 6). This second configuration of the valve 30 will thus lead to an increase of the overall temperature of the whole exhaust gas when the cylinders 4 of the first group of cylinders 4a are controlled to be active and the cylinders 4 of the second group of cylinders 4b are controlled to be inactive. Alternatively, no flow of exhaust gas supplied by the EGR line 20 is guided through the first group of cylinders 4a (FIG. 5). In this example, the engine operation is simplified and the exhaust gas temperature is maximized to ensure the minimum air flow going through the inactive group of cylinders.

The flap 39 can rotate around the flap axis 39c by an angle of few degrees to reach intermediate positions leading to a control of the flow of fresh air and exhaust gas guided through the first 4a and/or the second cylinder 4b.

Figure 7:
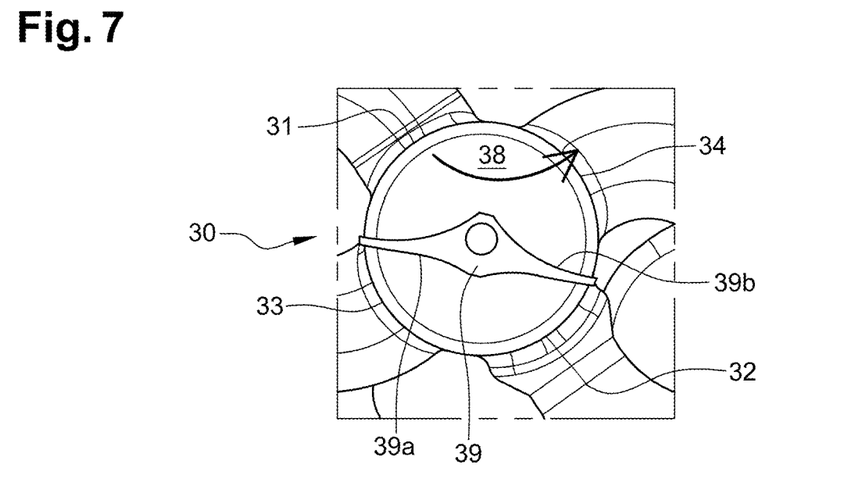

As illustrated in FIG. 7, alternatively, the wings 39a, 39b of the flap 39 are not in contact with seats 38a, 38b, 37c, 37d. In this example, the flap 39 has rotated clockwise around the flap axis 39c with an angle of 45° when compared to FIGS. 5 and 6. This example corresponds to a third configuration of the valve 30 wherein the fresh air supplied by the air inlet line 10 is guided through the second group of cylinders 4b only. The intake of fresh air for the first group of cylinders 4a is thus controlled to be zero or almost zero. In the same time, the main flow of exhaust gas can be supplied by the EGR line 20 is guided through the first group of cylinders 4a. This third configuration of the valve 30 will thus lead to an increase of the overall temperature of the whole exhaust gas when the cylinders 4 of the second group of cylinders 4b are controlled to be active and the cylinders 4 of the first group of cylinders 4a are controlled to be inactive.

In all the embodiments, the flap 39 can rotate around the flap axis 39c by an angle of few 25 degrees depending on the engine operating conditions to decrease fresh air intake pulsation and/or exhaust gas pulsation.

According to the present invention, the method for operating the internal combustion engine system according to the present invention comprising the step A) of selecting an operating mode of the internal combustion engine system, said operating mode being selecting between:
  i. a nominal operating mode in which all cylinders 4a, 4b are supplied with fuel and,
  ii. a cylinder deactivation mode in which the cylinders of the first group of cylinders 4a, are not supplied with fuel and
  iii. a cylinder deactivation mode in which the cylinders of the second group of cylinders 4b are not supplied with fuel.

Preferably, the controller 40 receives the selected operative mode via an electronic control unit (ECU). Then, in a step B), the controller 40 controls the four-way-valve 30 depending on the operating mode selected in step A) to reach a configuration selected from:
  1. A first configuration of the valve 30 corresponding to the nominal operating mode i),
  2. A second configuration of the valve 30 corresponding to the cylinder deactivation mode ii) and
  3. A third configuration of the valve 30 corresponding to the cylinder deactivation mode iii).

The internal combustion engine system according to the present invention improves the control of the flow of fresh air and exhaust gas supplied to the engine cylinders. In particular, the symmetry of pressure drops for fresh air and exhaust gas and the mixing of fresh air and exhaust gas is performed in more equal proportion. In contrary to conventional solutions, the invention provides a specific design of the four-way valve to ensure a better control of the flow pattern of fresh air and exhaust gas.

It is to be understood that the present invention is not limited to the embodiments described above and illustrated in the drawings; rather, the skilled person will recognize that many changes and modifications may be made within the scope of the appended claims.

The invention claimed is:

1. An internal combustion engine system, comprising:
  an internal combustion engine comprising a cylinder block housing a plurality of cylinders, a first intake manifold connected to a first group of cylinders, a second distinct intake manifold connected to a second group of cylinders and a first, respectively a second, exhaust manifold for receiving the exhaust gas emitted from the first, respectively the second, group of cylinders;
  an air line;
  an EGR line connected to the first and second exhaust manifolds;
  the system also includes a mixing unit comprising a four-way valve, said four-way valve having a first inlet connected to the air line, a second inlet connected to the EGR line, a first outlet connected to the first intake manifold and a second outlet connected to the second intake manifold;
  the system being characterized in that:
  said first inlet connected to the air line, said second inlet connected to the EGR line, said first outlet and said second outlet form a substantially X-shape;
  said first inlet connected to the air line and said second inlet connected to the EGR line are coaxial and the first outlet and second outlet are coaxial such that the first inlet connected to the air line is diagonally facing the second inlet connected to the EGR line and the first outlet is diagonally facing the second outlet.

2. The internal combustion engine system according to claim 1, wherein the four-way valve comprises a housing defining an internal chamber, the internal chamber having a first portion in fluid communication with the first inlet and the first outlet of the four-way valve and a second portion in fluid communication with the second inlet and the second outlet of the four-way valve, the first and second portions being separated by a central opening, the central opening being selectively closed by a flap.

3. The internal combustion engine system according to claim 2, wherein the flap is rotatably movable inside the internal chamber.

4. The internal combustion engine system according to claim 2, wherein the flap comprises a central hub connected to a first and a second symmetrical wings.

5. The internal combustion engine system according to claim 2, wherein the flap is configured to rotate around a flap axis; said flap axis being coaxial to a housing axis located at the center of the four-way valve housing.

6. The internal combustion engine system according to claim 4, wherein the wings extend in a plane that is off-centered with respect to the flap axis.

7. The internal combustion engine system according to claim 1, wherein the system comprises a controller for controlling the four-way-valve.

8. A vehicle comprising an internal combustion engine system according to claim 1.

9. A method for operating the internal combustion engine system according to claim 1, said method comprising the following steps:
  A. Selecting an operating mode of the internal combustion engine system, said operating mode being selecting between:
    i. a nominal operating mode in which all cylinders are supplied with fuel, and ii. a cylinder deactivation mode in which the cylinders of the first group of cylinders are not supplied with fuel, and iii. a cylinder deactivation mode in which the cylinders of the second group of cylinders are not supplied with fuel, B. Controlling the four-way-valve depending on the operating mode selected in step A).

10. The method according to claim 9, wherein in said nominal operating mode i), the intake gases supplied to the first intake manifold and to the second intake manifold have the same proportion of exhaust gas and the same proportion of air.

11. The method according to claim 9, wherein, in said cylinder deactivation mode ii), the intake gas supplied to the second intake manifold includes fresh air.

12. The method according to claim 11, wherein the intake gas supplied to the first intake manifold includes exhaust gas.

13. The method according to claim 9, wherein in said cylinder deactivation mode iii), the intake gas supplied to the first intake manifold includes fresh air.

14. The method according to claim 13, wherein the intake gas supplied to the second intake manifold includes exhaust gas.

15. The method according to claim 9, wherein in step B), the four-way-valve is controlled to reach a configuration selected from:

1. A first configuration of the valve corresponding to the nominal operating mode i),
2. A second configuration of the valve corresponding to the cylinder deactivation mode ii), and
3. A third configuration of the valve corresponding to the cylinder deactivation mode iii).

* * * * *